United States Patent
Nishihara et al.

(10) Patent No.: US 9,658,765 B2
(45) Date of Patent: May 23, 2017

(54) IMAGE MAGNIFICATION SYSTEM FOR COMPUTER INTERFACE

(75) Inventors: H. Keith Nishihara, Los Altos, CA (US); Shi-Ping Hsu, Pasadena, CA (US); Adrian Kaehler, Los Angeles, CA (US); Eric Gradman, Los Angeles, CA (US); Kjerstin Williams, Los Angeles, CA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 2505 days.

(21) Appl. No.: 12/183,786

(22) Filed: Jul. 31, 2008

(65) Prior Publication Data

US 2010/0026723 A1 Feb. 4, 2010

(51) Int. Cl.
*G06F 3/0488* (2013.01)

(52) U.S. Cl.
CPC .......... *G06F 3/04886* (2013.01); *G06F 2203/04805* (2013.01)

(58) Field of Classification Search
USPC .................................. 345/173, 178
See application file for complete search history.

(56) References Cited

U.S. PATENT DOCUMENTS

| | | | |
|---|---|---|---|
| 5,579,037 A | 11/1996 | Tahara et al. | |
| 5,754,348 A | 5/1998 | Soohoo | |
| 6,237,006 B1* | 5/2001 | Weinberg et al. | 707/797 |
| 6,590,583 B2 | 7/2003 | Soohoo | |
| 8,106,927 B2* | 1/2012 | Shoemaker et al. | 345/665 |
| 2003/0234799 A1* | 12/2003 | Lee | 345/660 |
| 2004/0125138 A1* | 7/2004 | Jetha et al. | 345/764 |
| 2005/0068342 A1* | 3/2005 | Ouchi et al. | 345/684 |
| 2006/0022955 A1* | 2/2006 | Kennedy | 345/173 |
| 2006/0132460 A1* | 6/2006 | Kolmykov-Zotov et al. | 345/173 |
| 2006/0202973 A1* | 9/2006 | Kobayashi et al. | 345/173 |
| 2006/0290678 A1* | 12/2006 | Lii | 345/173 |
| 2007/0030245 A1 | 2/2007 | Ngari et al. | |
| 2007/0033542 A1 | 2/2007 | Winser et al. | |
| 2008/0297471 A1* | 12/2008 | Hill et al. | 345/156 |

FOREIGN PATENT DOCUMENTS

EP  2 138 929 A2  12/2009

OTHER PUBLICATIONS

Examination Report for corresponding GB0912243.3 dated Oct. 4, 2010.

* cited by examiner

*Primary Examiner* — Jeffrey Chow
(74) *Attorney, Agent, or Firm* — Tarolli, Sundheim, Covell & Tummino LLP

(57) ABSTRACT

One embodiment of the invention includes a computer interface system. The system comprises a user interface screen configured to display visual content and an input system configured to detect a presence of an input object within a threshold distance along a normal axis of the user interface screen. The system further comprises a graphical controller configured to magnify a portion of the visual content that is located at an approximate location of a base of the normal axis on the user interface screen.

17 Claims, 12 Drawing Sheets

IMAGE MAGNIFICATION SYSTEM FOR COMPUTER INTERFACE

TECHNICAL FIELD

The present invention relates generally to interface systems, and specifically to an image magnification system for a computer interface.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. In addition, visual content that is displayed on computer monitors and display devices can be presented in much higher resolution based on increases in display technology. Thus, applications can be created that provide for opportunities to interact with more highly resolute images in the visual content as the range of computing applications broadens.

SUMMARY

One embodiment of the invention includes a computer interface system. The system comprises a user interface screen configured to display visual content and an input system configured to detect a presence of an input object within a threshold distance along a normal axis of the user interface screen. The system further comprises a graphical controller configured to magnify a portion of the visual content that is located at an approximate location of a base of the normal axis on the user interface screen.

Another embodiment of the invention includes a method for providing inputs to a computer system. The method comprises displaying visual content on a user interface screen and detecting a presence of an input object within a threshold distance of the user interface screen along a normal axis of the user interface screen. The method also includes magnifying a portion of the visual content at a location that is substantially centered at a base of the normal axis. The method also includes detecting interaction of the input object with the magnified portion of the visual content. The method further includes initiating a device input based on the interaction of the input object with the magnified portion of the visual content.

Another embodiment of the invention includes a computer interface system. The system comprises means for displaying visual content and means for detecting a presence of an input object within a threshold distance along a normal axis of the means for displaying the visual content. The system also includes means for concurrently maintaining data corresponding to the visual content and a scaled copy of the visual content. The scaled copy of the visual content having a scale factor relative to the visual content that is greater than one. The system further comprises means for superimposing a portion of the scaled copy of the visual content onto the visual content to magnify a respective portion of the visual content at a base of the normal axis in response to the detected presence of the input objects.

DETAILED DESCRIPTION

The present invention relates generally to interface systems, and specifically to an image magnification system for a computer interface. In a computer interface system, a user interface system can be configured to both display visual content and to receive inputs provided by a user, such as based on a touch-screen display device and/or a stereo camera system. The user can provide the inputs via an input object, such as a stylus, wand, or the user's finger. Upon the input object being moved to within a threshold distance of the associated display device, the input system can detect the presence of the input object, prior to contact with the display device. As an example, the input system can implement a break-beam system; acoustic, capacitive, or electromagnetic field (EMF) sensing techniques, radio-frequency identification (RFID) sensing techniques, or a stereo camera system to detect the proximity of the input object relative to a normal axis originating from the surface of the display device.

Upon the proximity of the input object being detected, the input system can provide an indication to an associated graphical controller to magnify a portion of the visual content at a location on the display device where the proximity of the input object is detected. The magnification can be such that the surrounding portions of the visual content are occluded, or can be such that the surrounding portions of the visual content can be distorted, thus allowing the surrounding portions to remain visible. The graphical controller can maintain data that includes the visual content and also includes a scaled copy of the visual content, such that the scaled copy of the visual content has a scale factor relative to the visual content that is greater than one. Thus, the graphical controller can provide the data to a visual content display engine that can magnify the visual content by superimposing a portion of the scaled copy of the visual content over the corresponding portion of the visual content. Thus, upon the portion of the visual content being magnified, the user can provide a device input by interacting with the magnified portion of the visual content, such as by touching the magnified portion of the visual content with the input object. Accordingly, a user can provide inputs on small input area portions of a high resolution display.

Figure 1:
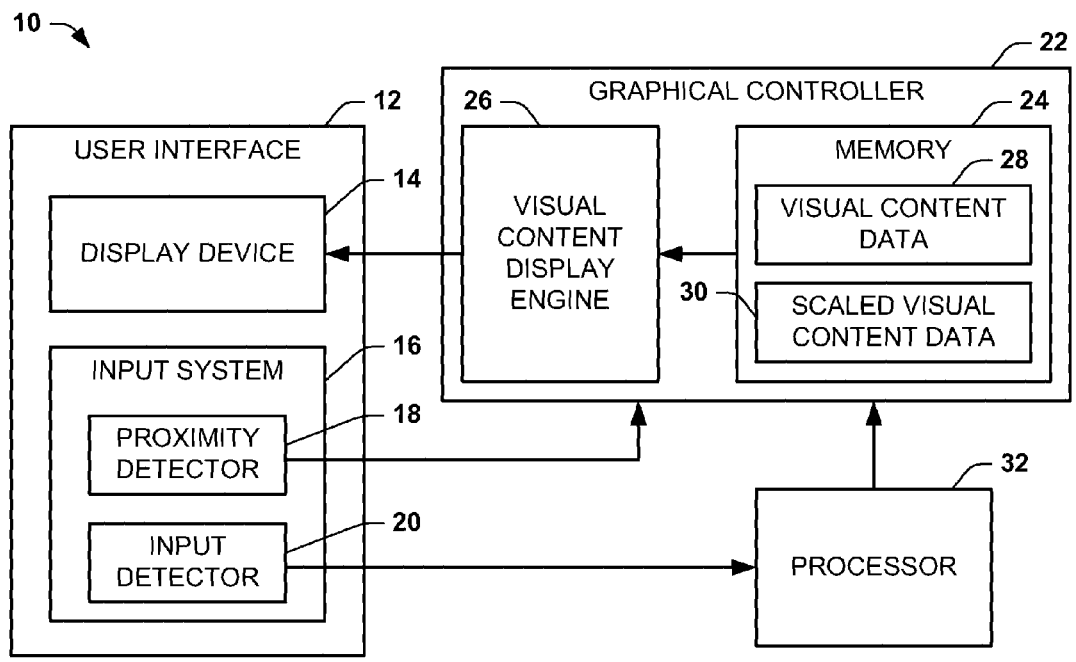
FIG. 1 illustrates an example of a computer interface system in accordance with an aspect of the invention.

FIG. 1 illustrates an example of a computer interface system 10 in accordance with an aspect of the invention. As an example, the computer interface system 10 can be implemented in a personal computer (PC), in a portable electronic device, such as a personal digital assistant (PDA) or cellular phone, or in a presentation or industrial computer. The computer interface system 10 includes a user interface 12 with which a user can provide input data to and can receive output data from the associated computer. The user interface 12 includes a display device 14, which can be configured as any of a variety of output devices that displays visual content. For example, the display device 14 can be configured as a computer monitor, an output screen on a hand-held computing device, or a projection screen.

The user interface 12 also includes an input system 16. As described in greater detail below, the input system 16 can be coupled with and/or otherwise associated with the display device 14, or can be configured separately from the display device 14. The input system 16 includes a proximity detector 18 and an input detector 20. The proximity detector 18 can be configured as any of a variety of detection devices or systems that can detect the presence of an input object that is implemented by a user to provide inputs to the computer interface system 10. The input detector 20 can be configured to receive device inputs based on interaction of the input object with the user interface 12.

As an example, the display device 14 can be configured as a touch-screen. Therefore, a user can implement his or her finger as the input object to provide device inputs based on touching selected portions of the visual content that is displayed on the display device 14. The input detector 20 can thus be configured as the touch-screen feature of the display device 14. Accordingly, the proximity detector 18 can be configured as a sensor system that detects when the user's finger is close to but not yet touching the display device 14. For example, the proximity detector 18 can be configured as a break-beam system, or can be configured to capacitively, acoustically, optically, or electro-magnetically detect the input object. As an example, the user's finger could be naked, such that the proximity detector 18 resides solely in the user interface 12. As another example, the user's finger could be clad in a glove, such that the glove could include a transmitter or a passive RFID tag that is detected by the proximity detector 18.

The input object could also include a device that is hand-held with which the user can provide the inputs to the computer interface system 10. For example, the input object could be a stylus, such as for use in a PDA. The stylus could be passive, or could include a transmitter or passive RFID tag, such as described above for a user's glove. In addition, the proximity detector 18 and the input detector 20 can be configured as a single device. For example, the input system 16 can be configured as a stereo camera system that is configured to rapidly take pictures of the input object from different physical perspectives and to calculate a three-dimensional physical location of the input object based on a parallax separation of the input object relative to each of the different physical perspectives. Therefore, the input system 16 could determine proximity of the input object relative to the display device 14 and whether the input object contacts the display device 14. Furthermore, the input detector 20 could receive the device inputs in a manner other than contact with the display device 14. For example, the user could provide a gesture with his or hand that corresponds to a device input, such that contact with the display device 14 is not necessary to provide the device input.

The purpose of the proximity detector 18, as described in greater detail below and throughout herein, is to allow a user to magnify a portion of the visual content that is displayed on the display device 14. Therefore, portions of the visible content that are very small and very finely resolute can be discerned by the user based on bringing the input object to within a given threshold distance proximity of the display device 14. As a result, the user can thus interact with the magnified portion of the visual content. As an example, a small grouping of fine resolution objects in the visual content that is provided on the display device 14 can be individually selected using a blunt input object, such as the user's finger, upon magnifying the grouping of the fine resolution objects. Accordingly, the user can move his or her finger or other input object close to the display device 14 to magnify the visual content, and can then interact with (e.g., touch) the portion of the magnified visual content with the finger or other input object to provide the appropriate device input corresponding to the respective fine resolution object therein.

To implement the magnification of the visual content, the proximity detector 18, upon detecting the presence of the input object within a threshold distance of the surface of the display device 14, is configured to communicate the proximity information to a graphical controller 22. As an example, the proximity information can include location information relative to the display device 14 that corresponds to the location of the input object that is within the threshold distance. The graphical controller 22 can be configured as a graphics card, such as implemented in a PC, and includes a memory 24 and a visual content display engine 26.

The memory 24 is configured to store visual content data 28 and scaled visual content data 30. The scaled visual content data 30 can be substantially identical to the visual content data 28 except that it is scaled by a scale factor that is greater than one. The visual content data 28 and the scaled visual content data 30 each correspond to the visual content that is displayed on the display device 14. Therefore, the memory 24 is configured to buffer both the visual content data 28 and the scaled visual content data 30, such as based on commands from a processor 32. The memory 24 is accessible by the visual content display engine 26 to provide the visual content data 28 or a combination of the visual content data 28 and the scaled visual content data 30 to the display device 14.

As an example, upon the proximity detector 18 providing the information regarding the presence of the input object to the graphical controller 22, the visual content display engine 26 is configured to superimpose a portion of the scaled visual content data 30 onto the respective corresponding location of the visual content data 28. The combination of the visual content data 28 and the superimposed portion of the scaled visual content data 30 is provided to the display device 14. As a result, the display device 14 provides the visual content that includes the superimposed portion of the scaled visual content data 30 over the visual content data 28 to magnify the respective corresponding portion of the visual content, as perceived by the user.

As an example, the visual content display engine 26 can superimpose the portion of the scaled visual content data 30 over the visual content data 28 statically. Therefore, the superimposed portion of the scaled visual content data 30 can remain fixed in location over the visual content data 28 so long as the input object remains within the threshold distance of the display device 14 and over the magnified portion of the visual content. As another example, the visual content display engine 26 can superimpose the portion of the scaled visual content data 30 over the visual content data 28 dynamically. Therefore, the superimposed portion of the scaled visual content data 30 can move over the visual content data 28, and thus across the visual content on the display device 14, as the input object moves across the visual content on the display device 14 within the threshold distance. The manner in which the portion of the scaled visual content data 30 is superimposed over the visual content data 28 is described in greater detail with reference to the examples of FIGS. 2-4.

Based on the magnification of the portion of the visual content provided by the display device 14, the user can thus interact with the magnified portion of the visual content. For example, the user can provide device inputs to the magnified portion of the visual content, such as by touching the display device 14 at the appropriate location on the magnified portion of the visual content with the input object. The device input can thus be provided to the processor 32. Therefore, the processor 32 can update the visual content data 28 and the scaled visual content data 30 based on the device input, and/or can update states within the associated computer system, store information, and/or implement any of a variety of computational functions based on the device input.

It is to be understood that the computer interface system 10 is not intended to be limited to the example of FIG. 1. As an example, the user interface 12 and the graphical controller 22 are demonstrated in the example of FIG. 1 simplistically, in that any of a variety of additional components can be included in each of the user interface 12 and the graphical controller 22. In addition, the computer interface system 10 can represent only a portion of an overall computer system, such that the user interface 12, the graphical controller 22, and the processor 32 can be included in and associated with additional computer architecture. Furthermore, it is to be understood that the input system 16 is not limited to inputs that are provided from the input object. For example, the input system 16 can also include a keyboard, mouse, or any of a variety of additional input devices in addition to those directly relating to the display device 14. Accordingly, the computer interface system can be configured in any of a variety of ways.

Figure 2:
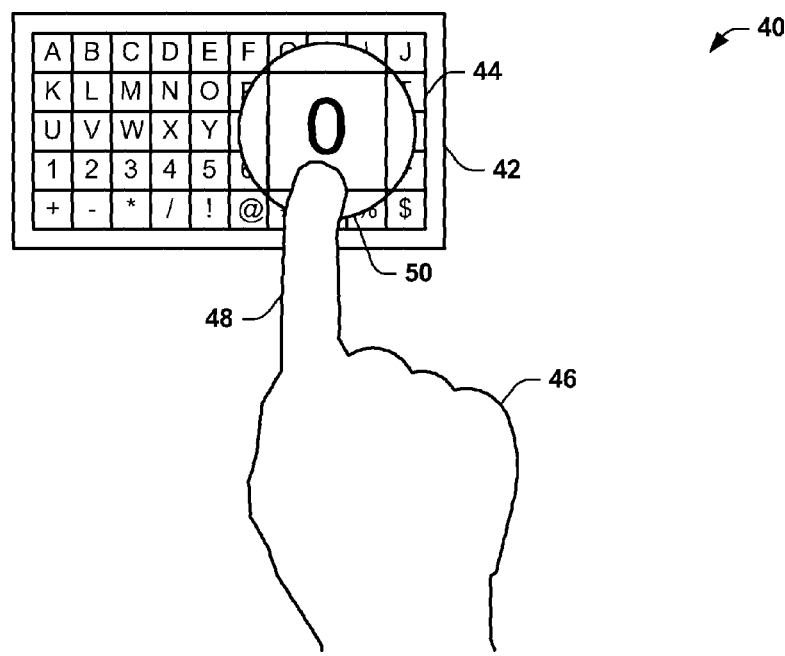
FIG. 2 illustrates an example of a diagram demonstrating magnification of visual content in accordance with an aspect of the invention.

FIG. 2 illustrates an example of a diagram 40 demonstrating magnification of visual content in accordance with an aspect of the invention. The diagram 40 demonstrates a display device 42, which could be configured substantially similar to the display device 14 in the example of FIG. 1. Thus, reference is to be made to the example of FIG. 1 in the following description of the example of FIG. 2.

As an example, the display device 42 can be a touch-screen. In the example of FIG. 2, the display device 42 is demonstrated as displaying visual content 44. Specifically, the visual content 44 is a virtual keypad with standard ASCII characters. Therefore, the display device 42 is configured as a touchpad that displays the keys that can be pressed to provide device inputs, such as to the processor 32 in the example of FIG. 1. The diagram 40 also demonstrates a user's hand 46 that is interacting with the visual content 44. In the example of FIG. 2, an index finger 48 is extended from the user's hand 46, such that the finger 48 is positioned to press one of the keys of the visual content 44. Therefore, the finger 48 is implemented as an input object.

Similar to as described in the example of FIG. 1, as the finger 48 approaches to within a threshold distance of the display device 42, a portion 50 of the visual content 44 is magnified. Specifically, in the example of FIG. 2, the portion 50 of the visual content 44 that is magnified is the "0" key and some surrounding detail. The location of the portion 50 of the visual content 44 that is magnified is substantially beneath the finger 48 (i.e., the input object), or substantially near a normal axis that extends from the screen of the display device 42 from which the threshold distance is defined. As demonstrated in the example of FIG. 2, the magnified portion 50 is demonstrated as slightly above the finger 48. Thus, it is to be understood that a center-point of the magnified portion 50 of the visual content 44 need not be located directly underneath the input object, but could be slightly off-center from the input object to maintain visibility.

As demonstrated in the example of FIG. 2, the tip of the finger 48 is substantially blunt, such that contact with one of the non-magnified keys of the visual content 44 could be difficult, such as resulting in unintentional key-strokes. Therefore, by magnifying the portion 50 of the visual content 44, the user can easily touch the intended "0" key without unintentionally touching any of the surrounding keys, as the input detector 20 can interpret any contact with any portion of the magnified "0" key to correspond to a "0" keystroke. As an example, the magnified portion 50 can remain fixed in position as magnifying the "0" key so long as the finger 48 remains over the magnified portion 50 and within the threshold distance. As another example, the magnified portion 50 can move across the visual content 44 on the display device 42 as the finger 48 moves across the visual content 44 on the display device 14 within the threshold distance.

As also demonstrated in the example of FIG. 2, the magnified portion 50 is demonstrated as occluding the surrounding portions of the visual content 44. Specifically, the magnified portion 50 covers a group of the surrounding keys in the example of FIG. 2, such that they are not visible and could be inaccessible based on the current location of the magnified portion 50. Occlusion is but one of a variety of ways in which the magnified portion 50 can be displayed relative to the rest of the visual content 44, and thus the visual content display engine 26 in the example of FIG. 1 is not limited to occluding the surrounding visual content 44, as demonstrated in the examples of FIGS. 3 and 4 below.

Figure 3:
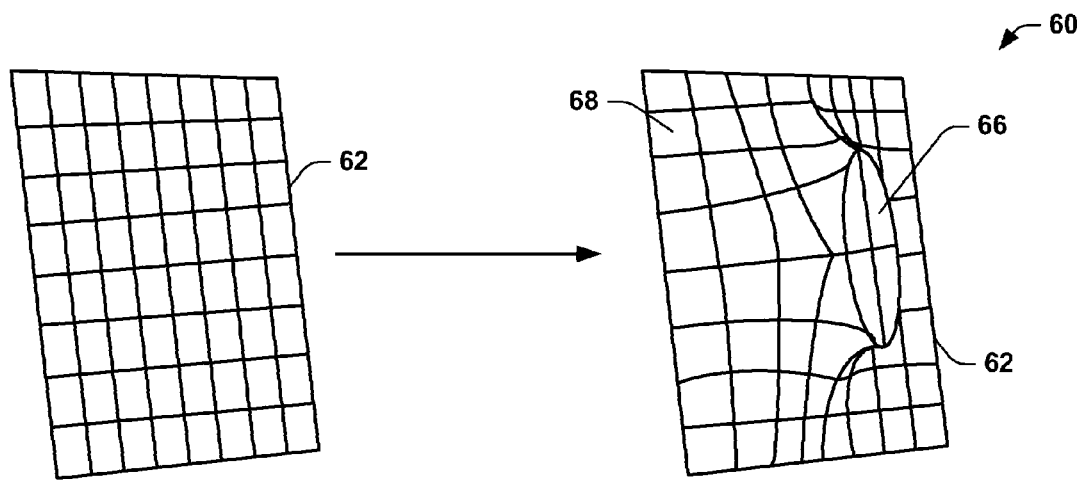
FIG. 3 illustrates another example of a diagram demonstrating magnification of visual content in accordance with an aspect of the invention.

FIG. 3 illustrates another example of a diagram 60 demonstrating magnification of visual content in accordance with an aspect of the invention. The diagram 60 demonstrates virtual contours of a first surface 62 of visual content. The first surface 62 of the visual content is demonstrated as substantially flat, such as perceived by a user viewing the display device 14 of the computer interface system 10 in the example of FIG. 1.

The diagram 60 also demonstrates virtual contours of a second surface 64 of visual content. In the example of FIG. 3, the second surface 64 of the visual content is demonstrated as a virtual membrane, such as based on texture mapping in a three-dimensional rendering system. Thus, the second surface 64 demonstrates a portion 66 of the scaled visual content that is rendered as protruding from the otherwise flat visual content 68. Accordingly, the visual content display engine 26 can be configured to superimpose the portion 66 of the scaled visual content onto the visual content 68 by deforming the virtual membrane to transform the first surface 62 into the second surface 64. As a result, the portions of the visual content 68 that surround the portion 66 of the scaled visual content are perceived by the user as substantially distorted. However, unlike that described above in the example of FIG. 2, the surrounding visual content 68 is not occluded, such that it can still be viewed by a user of the computer interface system 10. Accordingly, the user can adjust the location of the magnified portion of the visual content if need be to provide device inputs from the surrounding portions of the visual content upon viewing them.

Figure 4:
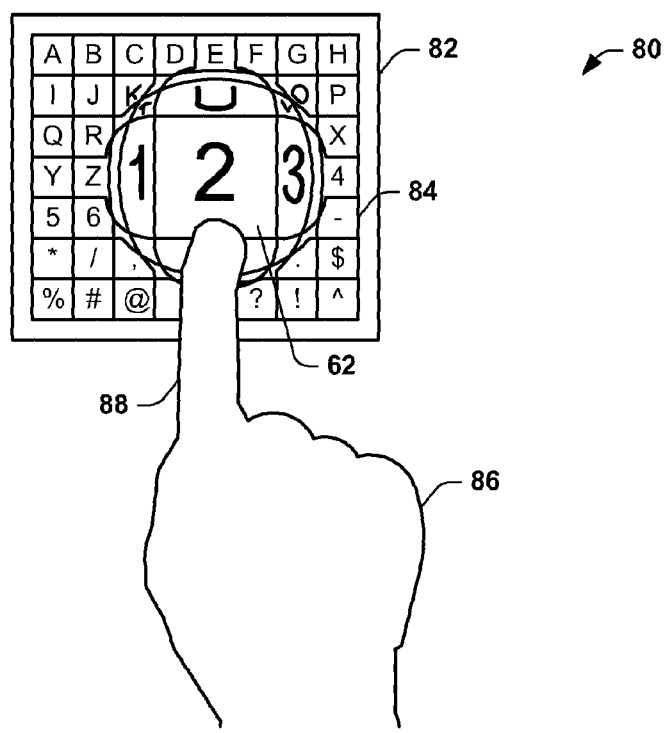
FIG. 4 illustrates another example of a diagram demonstrating magnification of visual content in accordance with an aspect of the invention.

FIG. 4 illustrates another example of a diagram 80 demonstrating magnification of visual content in accordance with an aspect of the invention. The diagram 80 demonstrates a display device 82, which could be configured substantially similar to the display device 14 in the example of FIG. 1. Thus, reference is to be made to the example of FIG. 1 in the following description of the example of FIG. 4.

As an example, the display device 82 can be a touchscreen, similar to as described above in the example of FIG. 2. The display device 82 is demonstrated as displaying visual content 84, such that the display device 82 is configured as a touchpad that displays the keys that can be pressed to provide device inputs. The diagram 80 also demonstrates a user's hand 86 that is interacting with the visual content 84. In the example of FIG. 4, an index finger 88 is extended from the user's hand 86, such that the finger 88 is positioned to press one of the keys of the visual content 84.

As the finger 48 approaches to within a threshold distance of the display device 82, a portion 90 of the visual content 84 is magnified. Specifically, in the example of FIG. 4, the portion 90 of the visual content 84 that is magnified is the "2" key and some surrounding detail. The location of the portion 90 of the visual content 84 that is magnified is substantially beneath the finger 88 (i.e., the input object), or substantially near a normal axis that extends from the screen of the display device 82 from which the threshold distance is defined. As an example, the magnified portion 90 can remain fixed in position as magnifying the "2" key so long as the finger 88 remains over the magnified portion 90 and within the threshold distance. As another example, the magnified portion 90 can move across the visual content 84 on the display device 82 as the finger 88 moves across the visual content 84 on the display device 14 within the threshold distance.

As demonstrated in the example of FIG. 4, the magnified portion 90 is demonstrated as distorting the surrounding portions of the visual content 84. Specifically, similar to as described above in the example of FIG. 3, the magnified portion 90 can result from the rendering of the superimposed portion of the scaled visual content over the visual content as deformation of a virtual membrane. Accordingly, the surrounding portions of the visual content 84 are distorted but still visible to the user. As a result, the user could be able to move the magnified portion 90 to be able to interact with the other keys upon viewing them. As an example, the user could move the magnified portion 90 slightly to the left to interact with the "1" key, slightly to the right to interact with the "3" key, or slight up to interact with the "U" key.

Figure 5:
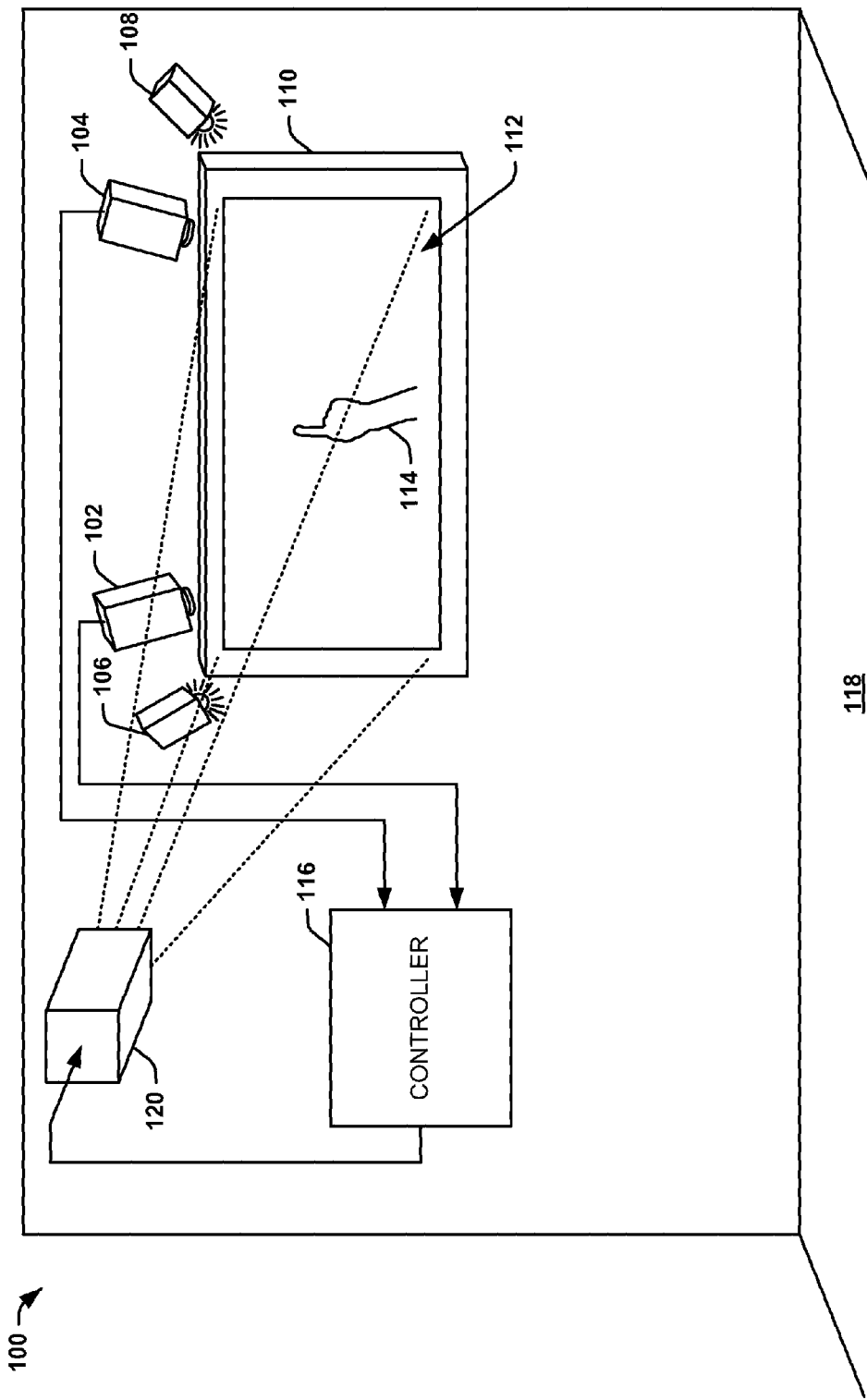
FIG. 5 illustrates another example of a computer interface system in accordance with an aspect of the invention.

FIG. 5 illustrates another example of a computer interface system 100 in accordance with an aspect of the invention. The computer interface system 100 includes a first camera 102, a second camera 104, a first IR light source 106, and a second IR light source 108 mounted above a vertical display surface 110. As an example, the vertical display surface 110 can be a projection screen. The first camera 102 and the second camera 104 may each include an IR filter, such that the respective camera may only be able to receive IR light. The first IR light source 106 and the second IR light source 108 each illuminate a gesture recognition environment 112 that is defined as the three-dimensional physical space in the foreground of the vertical display surface 110 that is visible by the first and second cameras 102 and 104.

An input object 114 can provide simulated inputs over the vertical display surface 110. In the example of FIG. 5, the input object 114 is demonstrated as a user's hand, such that the simulated inputs can be provided through hand gestures. It is to be understood that the use of a hand to provide simulated inputs via hand gestures is but one example implementation of the computer interface system 100. Examples of other types of input objects could include a stylus, wand, pointing stick, or any of a variety of devices that could provide gestures to simulate inputs. It is to be further understood that the input object 114 need not be specially designed or suited for use in the computer interface system 100. For example, a user's naked hand could be used as the input object 114, and thus a user need not wear a glove that includes retroreflective material or one or more position sensors to provide gesture inputs to the computer interface system 100 in accordance with an aspect of the invention.

In the example of FIG. 5, the first camera 102 and the second camera 104 each receive separate images of the input object 114, where each of the separate images received, respectively, by the first camera 102 and the second camera 104 are a matched set (i.e., matched pair). As an example, each of the first camera 102 and the second camera 104 could rapidly take still photograph images at, for example, sixty times per second, such that each still photograph image taken by the first camera 102 is matched to a still photograph image taken by the second camera 104 at substantially the same time. The input object 114 can appear to be in a different location in each image of the matched set captured by each of the first camera 102 and the second camera 104, respectively, due to parallax caused by the different mounted locations of each of the first camera 102 and the second camera 104. Therefore, the first and second cameras 102 and 104 are configured as a stereo camera assembly for location sensing of the input object 114. In the example of FIG. 5, the first and second cameras 102 and 104 can each be positioned as angled toward the center of the vertical display surface 110, such as to provide for more accurate position determination of the input object 114.

The images received by each of the first and second cameras 102 and 104 can be based on IR light that is reflected from the input object relative to substantially non-reflected light in the gesture recognition environment 112. Specifically, an object is illuminated at a relative brightness intensity that is $1/D^2$, where D is the distance from the light source. Thus, an object that is twice as far away as another appears four times dimmer. Accordingly, although some of the IR light emitted from the first and second IR light sources 106 and 108 may be reflected from the floor 118 beneath the vertical display surface 110, the intensity of the reflected light may be significantly less than that reflected from the input object 114.

The first camera 102 and the second camera 104 can each provide their respective separate images of the input object 114 to a controller 116. The controller 116 could reside, for example, within a computer (not shown) for which the computer interface system 100 is designed to provide a gesture recognition interface. It is to be understood, however, that the hosting of a controller is not limited to a standalone computer, but could be included in embedded processors. The controller 116 can process the respective images associated with the input object 114 to generate three-dimensional location data associated with the input object 114. Therefore, the controller 116 can provide functionality that is substantially similar to the input system 16, the graphical controller 22, and/or the processor 32 in the example of FIG. 1.

For example, each of the first camera 102 and the second camera 104 could each be mounted at pre-determined angles relative to the floor 118 beneath the vertical display surface 110. For a given matched pair of images of the input object 114, if the pre-determined angles of each of the cameras 102 and 104 are equal, then each point of the input object 114 in two-dimensional space in a given image from the camera 102 is equidistant from a corresponding point of the input object 114 in the respective matched image from the camera 104. As such, the controller 116 could determine the three-dimensional physical location of the input object 114 based on a relative parallax separation of the matched set of images of the input object 114 at a given time. In addition, using a computer algorithm, the controller 116 could also determine the three-dimensional physical location of features associated with portions of the input object 114, such as fingers and fingertips.

The computer interface system 100 can also include a projector 120. The projector 120 can provide visual content with which the user can interact and provide inputs. In the example of FIG. 5, the projector 120 can project the visual content onto the vertical display surface 110. Because the IR light sources 106 and 108 do not illuminate visible light, the IR illumination may not interfere with the visual content projected from the projector 120. The user can thus employ the input object 114 in the gesture recognition environment 112 to simulate inputs in an interactive manner with the visual content. In addition, because the controller 116 is configured to determine the three-dimensional physical location of the input object 114, the controller 116 can alter the visual content that is projected onto the vertical display surface 110, such that a portion of the visual content is magnified upon the input object 114 being moved to within a predetermined threshold distance that is programmed in the controller 116. As a result, the input object 114 can interact with the magnified portion of the visual content to provide device inputs by touching the vertical display surface 110 based on the controller 116 identifying the three-dimensional location of the input object 114 as being in contact with the vertical display surface 110.

It is to be understood that the computer interface system 100 in the example of FIG. 5 is intended to represent but one example of a computer interface system. For example, the computer interface system 100 could include more than two cameras, in multiple locations above and/or below the vertical display surface 110 that each supply respective images of the input object 114 to the controller 116. As an example, a three-way stereo (i.e., trinocular) camera system can be employed, or multiple cameras can be implemented to increase visual coverage for a wide vertical display surface 110 or in situations where head-room above the vertical display surface 110 is insufficient. As another example, the controller 116 can be configured to set more than one predetermined threshold, such that the portion of the visual content is magnified by a first amount at a first threshold distance and is magnified by a second amount at a second threshold distance that is closer to the vertical display surface 110. In addition, as yet another example, the projector 120 could project the visual content from behind the vertical display surface 110, or the vertical display surface 110 could be a liquid crystal display (LCD) or plasma monitor instead of a projection screen. As a further example, the IR light sources 106 and 108 may not illuminate in the IR spectrum, but could instead illuminate in a different spectrum, such as narrow frequency bands of visible light, with each of the respective cameras 102 and 104 having a corresponding spectrum filter. Accordingly, the computer interface system 100 can be configured in any of a variety of ways.

Figure 6:
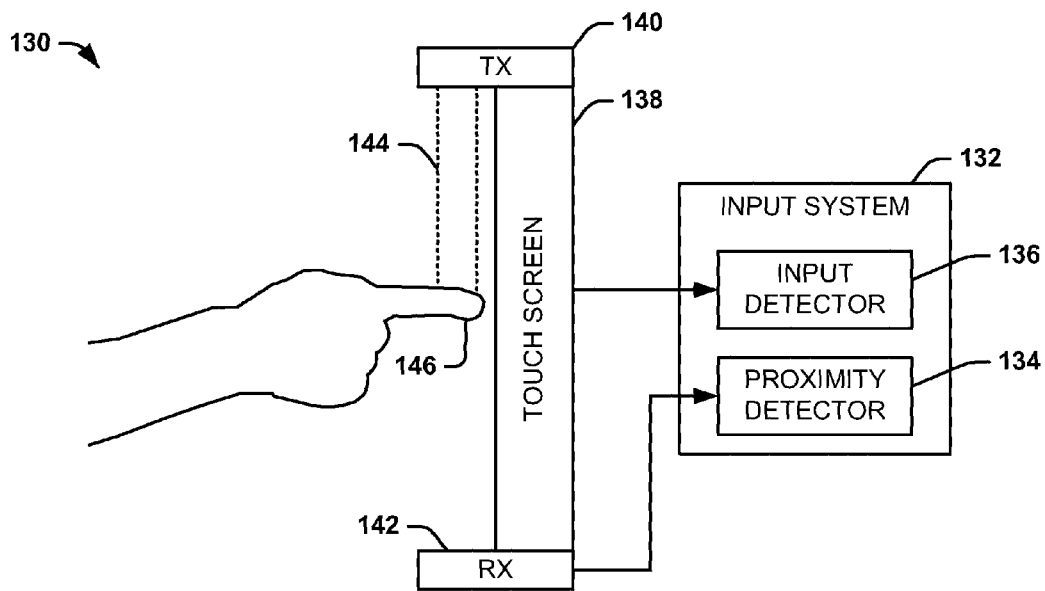
FIG. 6 illustrates an example of a user interface in accordance with an aspect of the invention.

FIG. 6 illustrates an example of a user interface 130 in accordance with an aspect of the invention. The user interface 130 includes an input system 132, which could be configured substantially similar to the input system 16 in the example of FIG. 1. Specifically, the input system 132 includes a proximity detector 134 and an input detector 136. The user interface 130 also includes a touch-screen 138, demonstrated in the example of FIG. 6 in a side-view. The touch-screen 138 can thus correspond to a display device, such as the display device 14 in the example of FIG. 1.

The user interface 130 also includes a break-beam detection system that includes a transmitter 140 and a receiver 142. In the example of FIG. 6, the transmitter 140 is demonstrated on the top edge of the touch-screen 138 and the receiver 142 is demonstrated on the bottom edge of the touch-screen 138. However, it is to be understood that the transmitter 140 can also be configured on one side edge of the touch-screen 138 and that the receiver 142 can also be configured on another side edge of the touch-screen 138 opposite the transmitter 140. The transmitter 140 is configured to transmit light beams 144, such as infrared (IR) light. The light beams 144 can be transmitted across the front of the touch-screen 138 in both the X and Y-directions as perceived by a user in front of the touch-screen 138. The receiver 142 is thus configured to receive the light beams 144. Therefore, an interposing object can block the light beams 144 and prevent them from being provided to the receiver 142. Accordingly, upon the receiver not receiving a portion of the light beams 144, the receiver 142 can thus identify an X/Y location of the object relative to the surface of the touch-screen 138.

An input object 146, demonstrated as a user's finger, is moved toward the touch-screen 138 in the example of FIG. 6. Thus, prior to the finger 146 touching the touch-screen 138 to provide a device input via the input detector 136, the finger 146 obstructs the light beams 144 at a specific X/Y location in front of the touch-screen 138. As a result, the receiver 142 provides the location information to the proximity detector 134. In response, the proximity detector 134 can be configured to provide the location information to a graphical controller (not shown), such as the graphical controller 22 in the example of FIG. 1. Accordingly, the graphical controller can magnify the visual content that is displayed on the touch-screen 138 at an approximate location of beneath the finger 146 based on the location information ascertained by the receiver 142. The user can thus initiate a device input by interacting with the magnified portion of the visual content, such as by touching the touch-screen 138 at the magnified portion of the visual content.

It is to be understood that the user interface 130 is not intended to be limited to the example of FIG. 6. As an example, the transmitter 140 is demonstrated in the example of FIG. 6 as emitting two layers of light beams 144. The receiver 142 could thus be configured to monitor both layers of the light beams 144. As a result, the associated graphical controller can be configured to magnify the visual content by a first amount in response to the first layer of the light beams 144 being broken, and by a second amount in response to the second layer of the light beams 144 being broken. In addition, it is to be understood that the transmitter 140 and the receiver 142 are not limited to the break beam system that is demonstrated in the example of FIG. 6. For example, the transmitter 140 can be configured to provide one or more beams that are mirrored at the periphery of the touch-screen 138 and/or moving across the surface of the touch-screen 138. Accordingly, the user interface 130 can be configured in any of a variety of ways.

Figure 7:
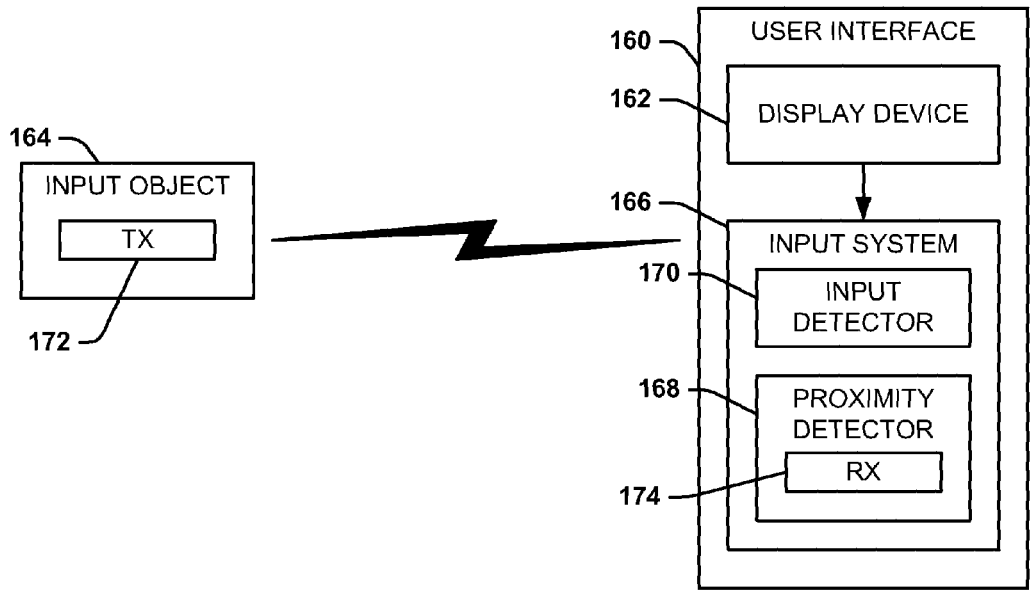
FIG. 7 illustrates another example of a user interface in accordance with an aspect of the invention.

FIG. 7 illustrates another example of a user interface 160 in accordance with an aspect of the invention. The user interface 160 can be included in a computer system or a portable electronic device, such as a cellular phone and/or a PDA. The user interface 160 includes a display device 162 to which a user can provide input data and from which the user can receive output data. As an example, display device 162 can be configured to display visual content and to receive touch inputs from an input object 164, which can be configured, for example, as a stylus, wand, or glove. The user interface 160 also includes an input system 166. Similar to as described above in the example of FIG. 1, the input system 166 includes a proximity detector 168 and an input detector 170. The input detector 170 can be configured to receive device inputs based on interaction of the input object 164 with the display device 162, such as touching portions of the visual content with the input object 164.

In the example of FIG. 7, the input object 164 includes a transmitter 172 and the proximity detector 168 includes a receiver 174. The transmitter 172 is thus configured to transmit a signal that is detected by the receiver 174. As an example, the transmitter 172 can provide an RF signal, an optical signal, an acoustic signal, or an electro-magnetic signal. Therefore, the proximity detector 168 can be configured to determine a location of the input object 164 relative to the display device 162 and to set a threshold distance based on characteristics of the signal that is transmitted from the transmitter 172. Accordingly, an associated graphical controller (not shown) can magnify the visual content at the determined location on the display device 162 based on the proximity detector 168 detecting that the input object has been moved to within the threshold distance based on the signal transmitted from the transmitter 172 to the receiver 174.

It is to be understood that the user interface 160 is not intended to be limited to the example of FIG. 7. As an example, the user interface 160 is demonstrated in the example of FIG. 7 simplistically, in that any of a variety of additional components can be included in the user interface 160. In addition, the user interface 160 can represent only a portion of an overall computer interface system, such that the user interface 160 can be included in and associated with additional computer architecture. Furthermore, it is to be understood that the input system 166 is not limited to inputs that are provided from the input object 164. For example, the input system 166 can also include a keyboard, mouse, or any of a variety of additional input devices in addition to those directly relating to the display device 164. Accordingly, the user interface 160 can be configured in any of a variety of ways.

Figure 8:
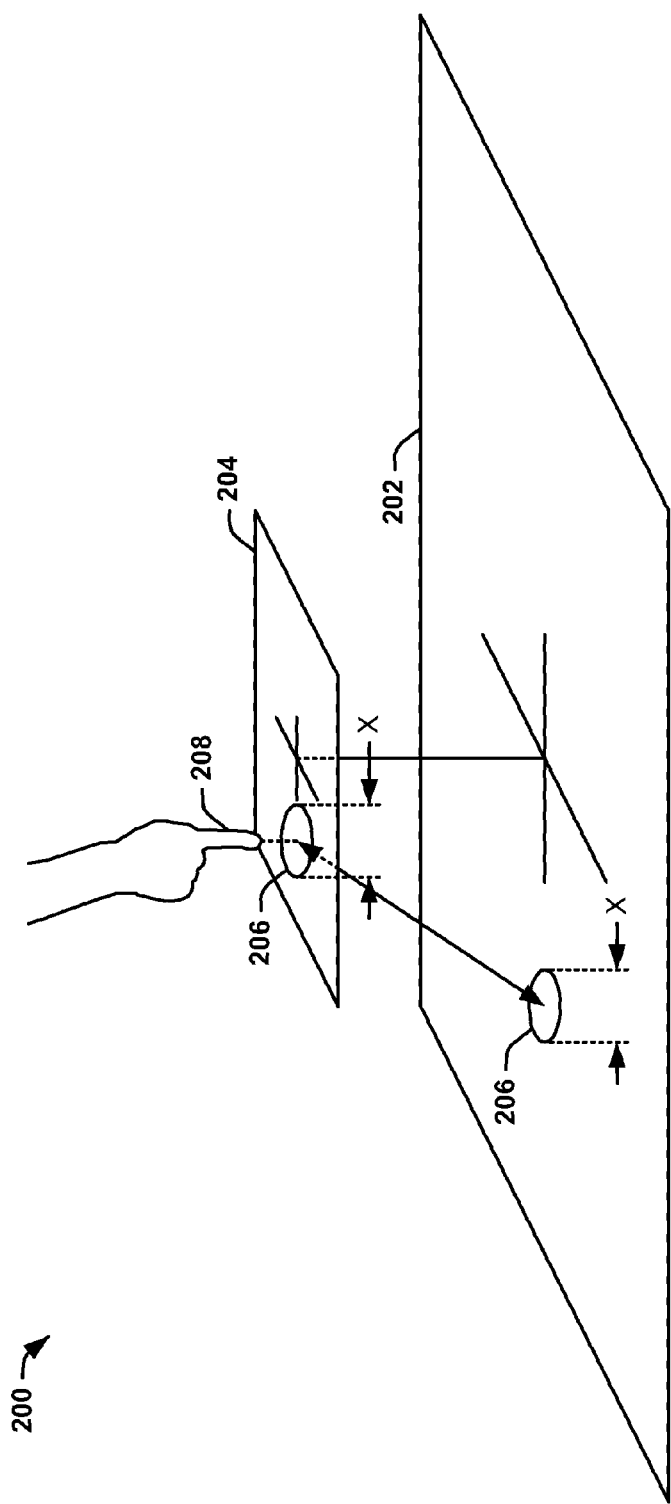
FIGS. 8 and 9 illustrate an example of a diagram demonstrating superimposition and motion of scaled visual content onto visual content in accordance with an aspect of the invention.
Figure 9:
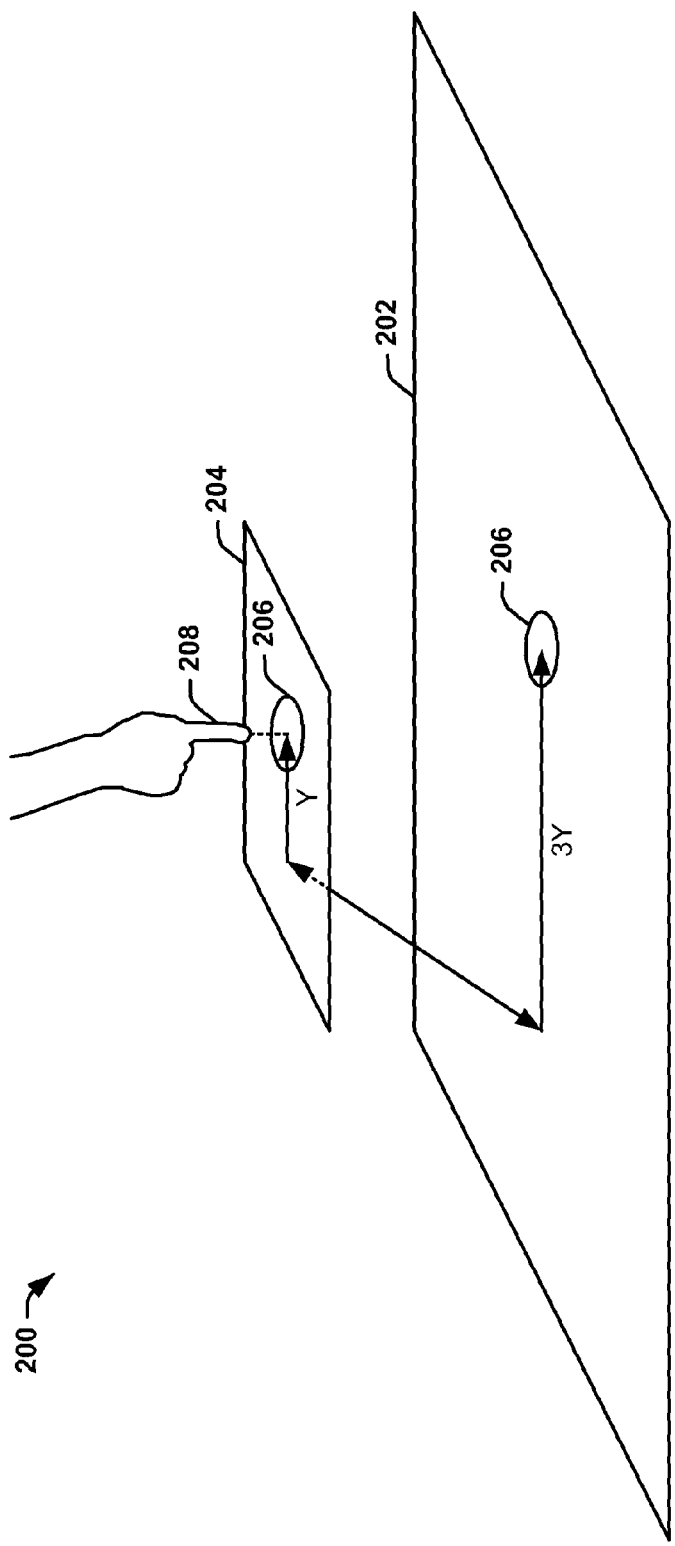

FIGS. 8 and 9 illustrate an example of a diagram 200 demonstrating superimposition and motion of scaled visual content 202 onto visual content 204 in accordance with an aspect of the invention. Specifically, FIG. 8 demonstrates superimposition of a portion 206 of the scaled visual content 202 onto the visual content 204, and FIG. 9 demonstrates motion of the superimposed portion 206 of the scaled visual content 202 across the visual content 204. In the example of FIGS. 8 and 9, the visual content 204 and the scaled visual content 202 are each demonstrated as planar surfaces. It is to be understood that the visual content 204 is demonstrated such as to simulate its appearance on an associated display device (not shown). As such, an input object 208, illustrated as a user's finger in the example of FIGS. 8 and 9, is demonstrated as interacting with the visual content 204 as if it were being displayed on an associated display device.

In the example of FIG. 8, the scaled visual content 202 is demonstrated as being three times the size of the visual content 204. Therefore, the scaled visual content 202 has a scale factor of three relative to the visual content 204. The example of FIG. 8 demonstrates the input object 208 moving to within a threshold distance of the visual content 204 as it is displayed on an associated display device. Therefore, an associated graphical controller (not shown) magnifies a portion of the visual content by superimposing the portion 206 of the scaled visual content 202 onto the visual content 204. Specifically, the portion 206 is a substantially circular portion of the scaled visual content 202 that is superimposed over the visual content 204, such that the portion 206 is approximately equal in size, demonstrated in the example of FIG. 8 as a diameter "X", in both the visual content 204 and the scaled visual content 202. Therefore, the portion 206 is approximately identical in both the visual content 204 and the scaled visual content 202.

The portion 206 can appear on the visual content 204 such that surrounding portions of the visual content 204 are either occluded or distorted, such as described above in the examples of FIGS. 2-4. The location of the portion 206 on the visual content 204 can correspond to an approximately equal, scaled location from the scaled visual content 202. In other words, the portion 206 can be a portion of the scaled visual content 202 that corresponds to the scaled location on the visual content 204, thus resulting in a magnification of substantially the same visual content as perceived by the user.

In the example of FIG. 9, the input object 208 is moved across the visual content 204 (i.e., across the surface of the display device) a distance "Y". Therefore, the associated graphical controller can maintain the superimposition of the portion 206 of the scaled visual content 202 onto the visual content 204 throughout the motion of the input object 208 within the threshold distance. However, the motion of the portion 206 across the scaled visual content 202 can likewise be scaled by the same scale factor. Therefore, in the example of FIG. 9, the portion 206 is demonstrated as having moved across the scaled visual content 202 by a distance "3Y", and thus three times the distance that the portion 206 moves across the visual content 204. The scale factor of the motion is thus approximately equal to the scale factor of the scaled visual content 202 relative to the visual content 204. As a result, the scaled visual content 202 remains scaled and centered relative to the visual content 204 during the superimposition of the portion 206 of the scaled visual content 202 onto the visual content 204. In other words, upon the user moving the input object 208 to within the threshold distance, the user can magnify any portion of the visual content 204 by moving the input object 208 across the visual content 204 while remaining within the threshold distance during the entire motion.

The example of FIGS. 8 and 9 therefore demonstrates one example of motion of the scaled visual content 202 relative to the visual content 204 upon superimposing the portion 206 of the scaled visual content 202 onto the visual content 204. Specifically, the example of FIGS. 8 and 9 demonstrates how the entirety of the scaled visual content 202 can be piece-wise viewed by a user by moving the input object 208 across the visual content 204. However, because the motion of the portion 206 is scaled by the same scale factor as the scaled visual content 202 relative to the visual content 204, it might be difficult for a user to move to specific locations on the visual content 204 for interaction with those specific locations because the superimposed portion 206 is updated rapidly even at only slight movement of the input object 208.

Figure 10:
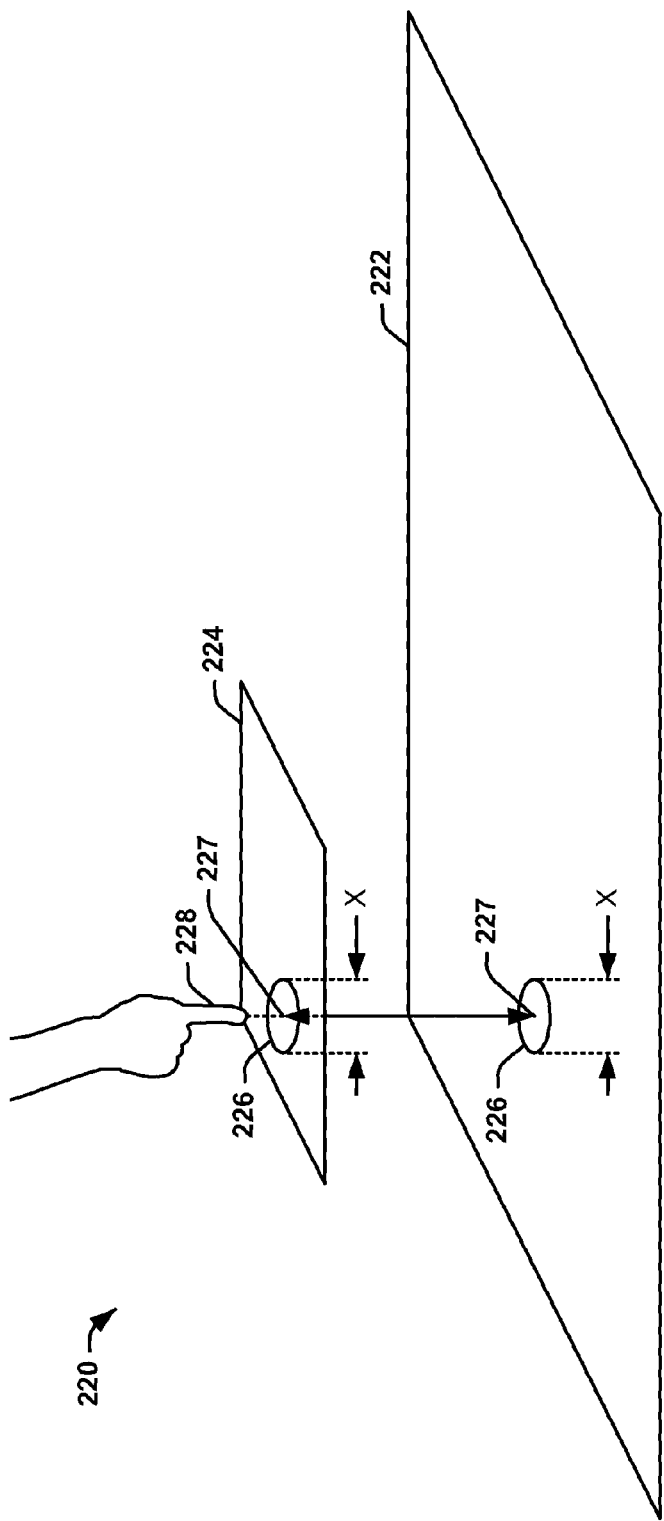
FIGS. 10 and 11 illustrate another example of a diagram demonstrating superimposition and motion of scaled visual content onto visual content in accordance with an aspect of the invention.
Figure 11:
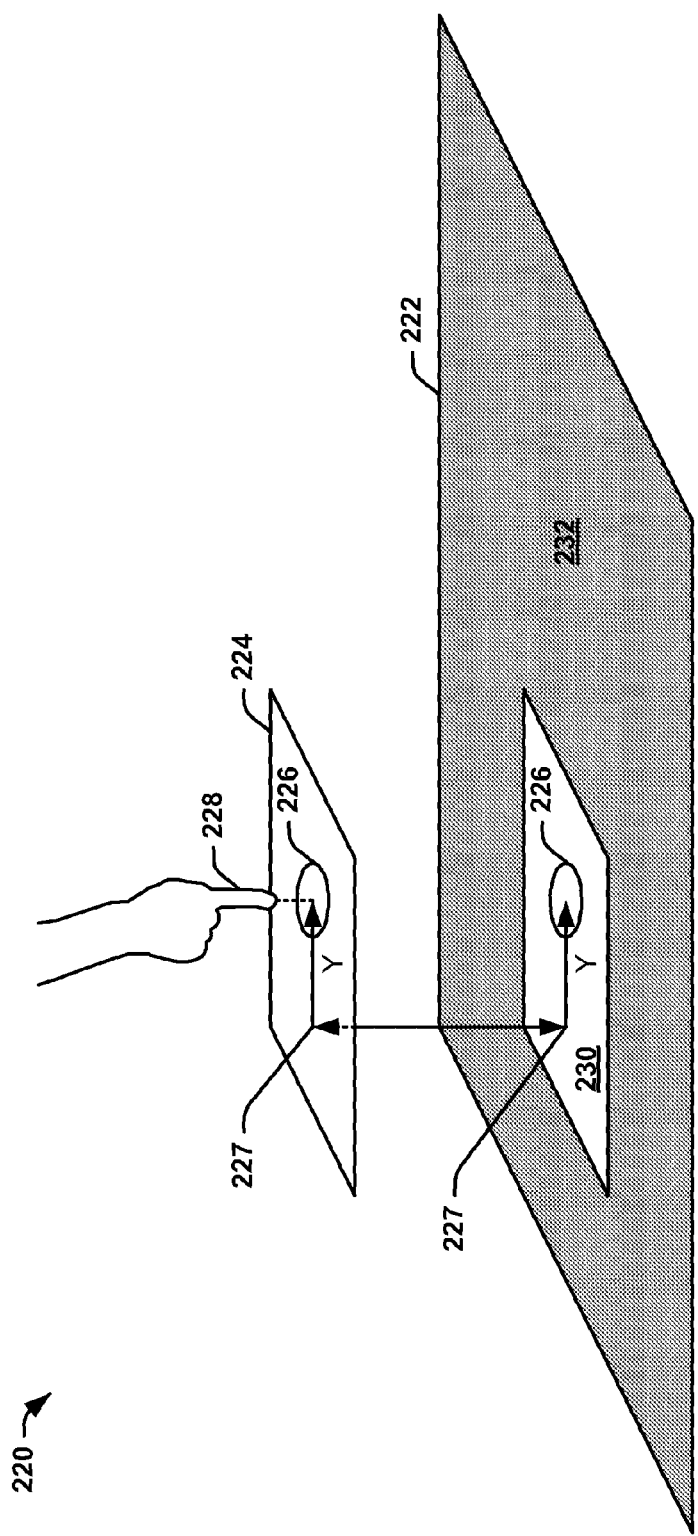

FIGS. 10 and 11 illustrates another example of a diagram 220 demonstrating superimposition and motion of scaled visual content 222 onto visual content 224 in accordance with an aspect of the invention. Specifically, FIG. 10 demonstrates superimposition of a portion 226 of the scaled visual content 222 onto the visual content 224, and FIG. 11 demonstrates motion of the superimposed portion 226 of the scaled visual content 222 across the visual content 224. In the example of FIGS. 10 and 11, the visual content 224 and the scaled visual content 222 are each demonstrated as planar surfaces. Thus, similar to as described in the example of FIGS. 8 and 9, it is to be understood that the visual content 224 is demonstrated such as to simulate its appearance on an associated display device (not shown), and that an input object 228, illustrated as a user's finger in the example of FIGS. 10 and 11, is demonstrated as interacting with the visual content 224 as if it were being displayed on an associated display device.

The example of FIG. 10 demonstrates the input object 228 moving to within a threshold distance of the visual content 224 as it is displayed on an associated display device. Therefore, an associated graphical controller (not shown) magnifies a portion of the visual content by superimposing the portion 226 of the scaled visual content 222 onto the visual content 224. Specifically, the portion 226 is a substantially circular portion of the scaled visual content 222 that is superimposed over the visual content 224, such that the portion 226 is approximately equal in size, demonstrated in the example of FIG. 10 as a diameter "X", in both the visual content 224 and the scaled visual content 222. Therefore, the portion 226 is approximately identical in both the visual content 224 and the scaled visual content 222. The portion 226 is superimposed over the visual content 224 at a reference point 227 that, as described in greater detail below, remains fixed while the input object 228 is within the threshold distance of the visual content 224.

The portion 226 can appear on the visual content 224 such that surrounding portions of the visual content 224 are either occluded or distorted, such as described above in the examples of FIGS. 2-4. Similar to as described above in the example of FIGS. 8 and 9, the location of the portion 226 on the visual content 224 can correspond to an approximately equal, scaled location from the scaled visual content 222. In other words, the portion 226 can be a portion of the scaled visual content 222 that corresponds to the scaled location on the visual content 224, thus resulting in a magnification of substantially the same visual content as perceived by the user.

In the example of FIG. 11, the input object 228 is moved across the visual content 224 (i.e., across the surface of the display device) a distance "Y" from the reference point 227. Therefore, the associated graphical controller can maintain the superimposition of the portion 226 of the scaled visual content 222 onto the visual content 224 throughout the motion of the input object 228 within the threshold distance. However, the motion of the portion 226 across the scaled visual content 222 can be equal in distance as the motion of the portion 226 across the visual content 224 relative to the reference point 227. In other words, in the example of FIG. 11, the motion of the portion 226 across the scaled visual content 222 is not scaled. Therefore, in the example of FIG. 11, the portion 226 is demonstrated as having moved across the scaled visual content 222 by a distance "Y", and is thus equal to the distance that the portion 226 moves across the visual content 224.

Upon the user moving the input object 228 to within the threshold distance of the display device, the graphical controller can fix the location of the visual content 224 at the reference point 227 where the portion 226 is superimposed relative to the scaled visual content 222. As a result, while the input object 228 remains within the threshold distance, only a portion 230 of the scaled visual content 222 can be viewed by the user in response to moving the input object 228 across the visual content 224 because the scaled visual content 222 does not move relative to the visual content 224. The remaining portions 232 of the scaled visual content 222 are thus inaccessible to the user unless the user removes the input object 228 from the threshold distance, at which the user could move the input object 228 to within the threshold distance at a different location on the visual content 224. As such, a different portion of the visual content can be magnified, and a corresponding different portion 230 of the scaled visual content 222 can be accessible.

The example of FIGS. 10 and 11 therefore demonstrates another example of motion of the scaled visual content 222 relative to the visual content 224 upon superimposing the portion 226 of the scaled visual content 222 onto the visual content 224. Specifically, the example of FIGS. 10 and 11 demonstrates that only limited portions of the scaled visual content 222 can be viewed by a user by moving the input object 228 across the visual content 224. However, because the motion of the portion 226 is not scaled, it may be easier for a user to move to specific locations on the visual content 224 for interaction with those specific locations because the superimposed portion 226 is not updated rapidly at slight movement of the input object 228, unlike the above described example of FIGS. 8 and 9.

Figure 12:
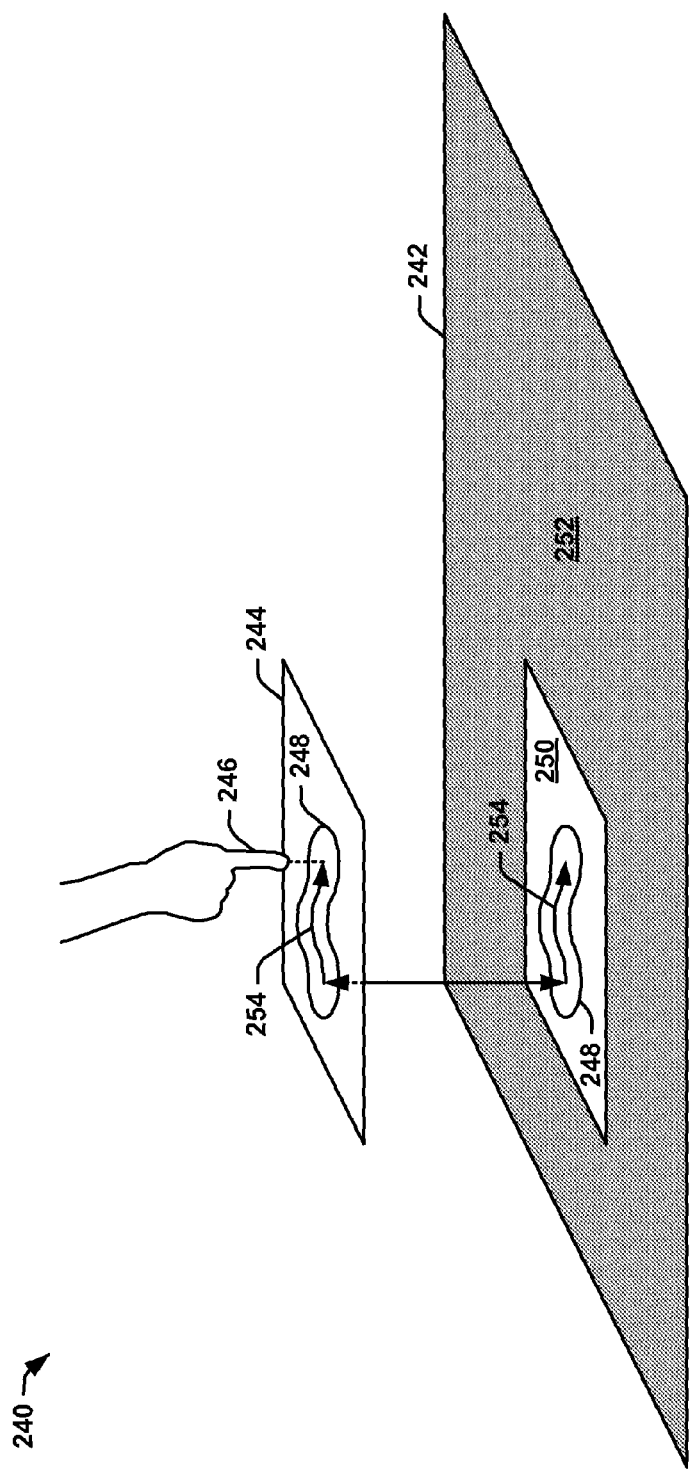
FIG. 12 illustrates another example of a diagram demonstrating superimposition and motion of scaled visual content onto visual content in accordance with an aspect of the invention.

FIG. 12 illustrates another example of a diagram 240 demonstrating superimposition and motion of scaled visual content 242 onto visual content 244 in accordance with an aspect of the invention. In the example of FIG. 12, an input object 246 is moved to within a threshold distance of the display device. As a result, similar to as described above in the example of FIGS. 10 and 11, the graphical controller (not shown) superimposes a portion 248 of the scaled visual content 242 onto the visual content 244 at a fixed reference location. Accordingly, motion of the portion 248 of the scaled visual content 242 is approximately equal across both the visual content 244 and the scaled visual content 242, resulting in an accessible portion 250 and an inaccessible portion 252 of the scaled visual content 242.

However, in the example of FIG. 12, the superimposed portion 248 remains on the visual content 244 as the input object 246 moves across the visual content 244, even after the input object 246 is no longer above the superimposed portion 248. In other words, the superimposed portion 248 can grow as the input object 246 is moved across the visual content 244. This is indicated in the example of FIG. 12 based on the arrows 254 that demonstrate the motion of the input object 246 across the visual content 244 in the superimposed portion 248. The portion 248 can remain superimposed onto the visual content 244 as long as the user maintains the input object 246 within the threshold distance. Accordingly, larger portions of the scaled visual content 252 can be viewed by the user in response to moving the input object 246.

Figure 13:
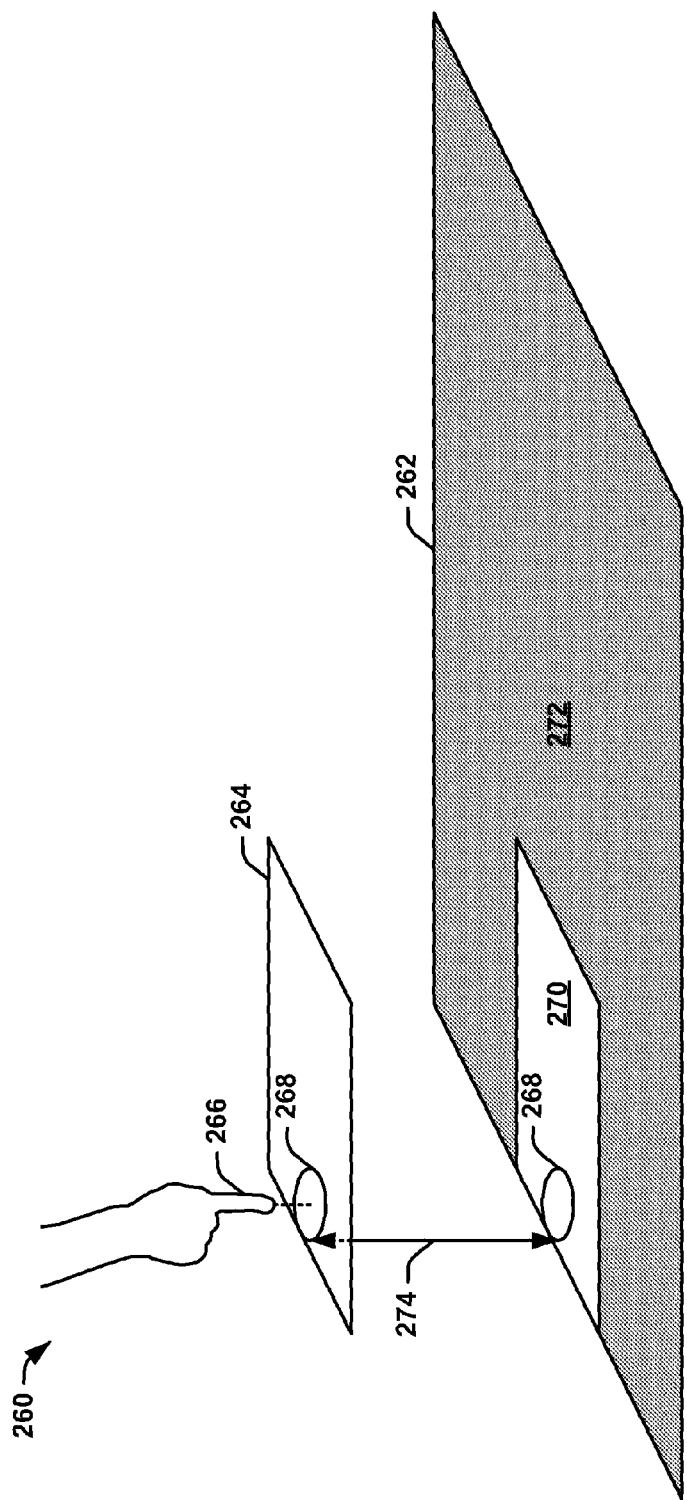
FIG. 13 illustrates an example of a diagram demonstrating superimposition of scaled visual content onto visual content in accordance with an aspect of the invention.

FIG. 13 illustrates an example of a diagram 260 demonstrating superimposition of scaled visual content 262 onto visual content 264 in accordance with an aspect of the invention. In the example of FIG. 13, an input object 266 is moved to within a threshold distance of the display device. As a result, similar to as described above in the example of FIGS. 10 and 11, the graphical controller (not shown) superimposes a portion 268 of the scaled visual content 262 onto the visual content 264 at a fixed reference location. Accordingly, motion of the portion 268 of the scaled visual content 262 is approximately equal across both the visual content 264 and the scaled visual content 262, resulting in an accessible portion 270 and an inaccessible portion 272 of the scaled visual content 262.

As described above in the example of FIGS. 10 and 11, only limited portions of the scaled visual content 262 can be viewed by a user by moving the input object 266 across the visual content 264. Thus, it can be difficult for a user to view magnified images at the extreme edges of the scaled visual content 262 based on the scaling of the fixed point relative to each of the visual content 264 and the scaled visual content 262. Therefore, the graphical controller can be configured to fix the locations of the visual content 264 and the scaled visual content 262 relative to each other at their respective extreme edges based on the input object 266 being moved to within the threshold distance at a predetermined threshold away from the extreme edge. In other words, the graphical controller can be configured to align an edge of the scaled visual content 262 with a respective edge of the visual content 264 in response to the input object 266 being moved to within the threshold distance within a threshold of a corresponding edge of the user interface screen on which the visual content 264 is displayed. As an example, the threshold from the edge can be approximately equal to a radius of the portion 268. As such, the portion 268 of the scaled visual content 262 is superimposed at a center-point that is an equal distance from the extreme edge in the visual content 264 as it appears from the respective extreme edge of the scaled visual content 262.

In the example of FIG. 13, the fixed reference location at which the scaled visual content 262 is aligned with the visual content 264 is demonstrated at the respective extreme edges by the arrow 274. It is to be understood that the scaling of the superimposition along the other Cartesian axis that is not edge-aligned is preserved by the graphical controller. Accordingly, the user can easily view magnified visual content that resides at the substantial edges of the scaled visual content 264 based on approaching the display device surface with the input object 266 at a location that is approximately near the content to be magnified on the visual content 264.

Figure 14:
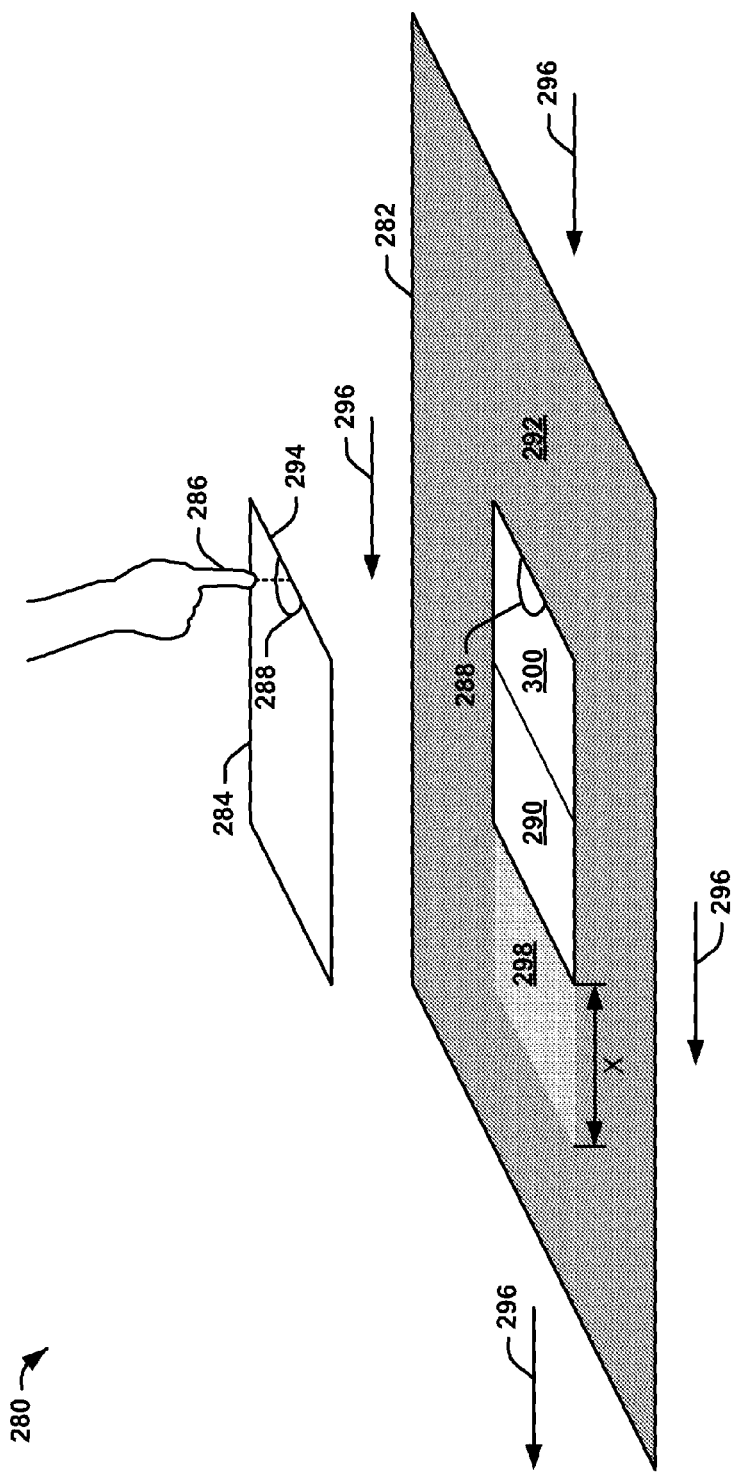
FIG. 14 illustrates an example of a diagram demonstrating motion of scaled visual content relative to visual content in accordance with an aspect of the invention.

FIG. 14 illustrates an example of a diagram 280 demonstrating motion of scaled visual content 282 relative to visual content 284 in accordance with an aspect of the invention. In the example of FIG. 14, an input object 286 is moved to within a threshold distance of the display device. As a result, similar to as described above in the example of FIGS. 10 and 11, the graphical controller (not shown) superimposes a portion 288 of the scaled visual content 282 onto the visual content 284 at a reference location. Accordingly, motion of the portion 288 of the scaled visual content 282 is approximately equal across both the visual content 284 and the scaled visual content 282, resulting in an accessible portion 290 and an inaccessible portion 292 of the scaled visual content 282. As described in greater detail below, in the example of FIG. 14, the reference location is not fixed.

As described above in the example of FIGS. 10 and 11, only limited portions of the scaled visual content 282 can be viewed by a user by moving the input object 286 across the visual content 284. Thus, it can be difficult for a user to view magnified images at the extreme edges of the scaled visual content 282 based on the scaling of the fixed point relative to each of the visual content 284 and the scaled visual content 282. In addition, a user may want to be able to view the inaccessible portion 292 without having to retract the input object 286 and repositioning it in a different location above the visual content 284 that is displayed on the display device.

In the example of FIG. 14, after establishing the reference location between the visual content 284 and the scaled visual content 282, the graphical controller can be configured to move the scaled visual content 282 relative to the visual content 284. Specifically, upon the user moving the input object 286 within the threshold distance to within a threshold of an edge of the visual content 284, the graphical controller can move the scaled visual content 282 in a direction opposite the edge of the visual content 284. As demonstrated in the example of FIG. 14, upon the input object 286 being moved to within a threshold of an edge 294 of the visual content 284, the scaled visual content 282 is moved in a direction opposite the edge 294, as indicated by the direction arrows 296. In the example of FIG. 14, the scaled visual content 282 has been moved a distance "X" relative to the visual content 284. Thus, a portion 298 of the scaled visual content 282 was part of the accessible portion 290 prior to the movement of the scaled visual content 282, and is now demonstrated as part of the inaccessible portion 292. Similarly, a portion 300 of the scaled visual content 282 was part of the inaccessible portion 292 prior to the movement of the scaled visual content 282, and is now demonstrated as part of the accessible portion 290. The scaled visual content 282 can continue to move in the direction 296 until the user moves input object 286 away from the edge threshold or further than the distance threshold to the surface of the display device, or until the edge 294 of the visual content 284 becomes aligned with the corresponding edge of the scaled visual content 282.

It is to be understood that other manners in which the scaled visual content 282 can be moved relative to the visual content 284 can be realized. As an example, another input provided to the associated computer system, such as based on a gesture or an input from a peripheral device, can be implemented to move the scaled visual content 282 relative to the visual content 284. As another example, a given computer interface system can incorporate the examples of FIGS. 11 and 12 with regard to superimposition and/or movement of the scaled visual content 282 relative to the visual content 284. Accordingly, any of a variety of manners of superimposition and/or movement of scaled visual content relative to visual content can be realized.

Figure 15:
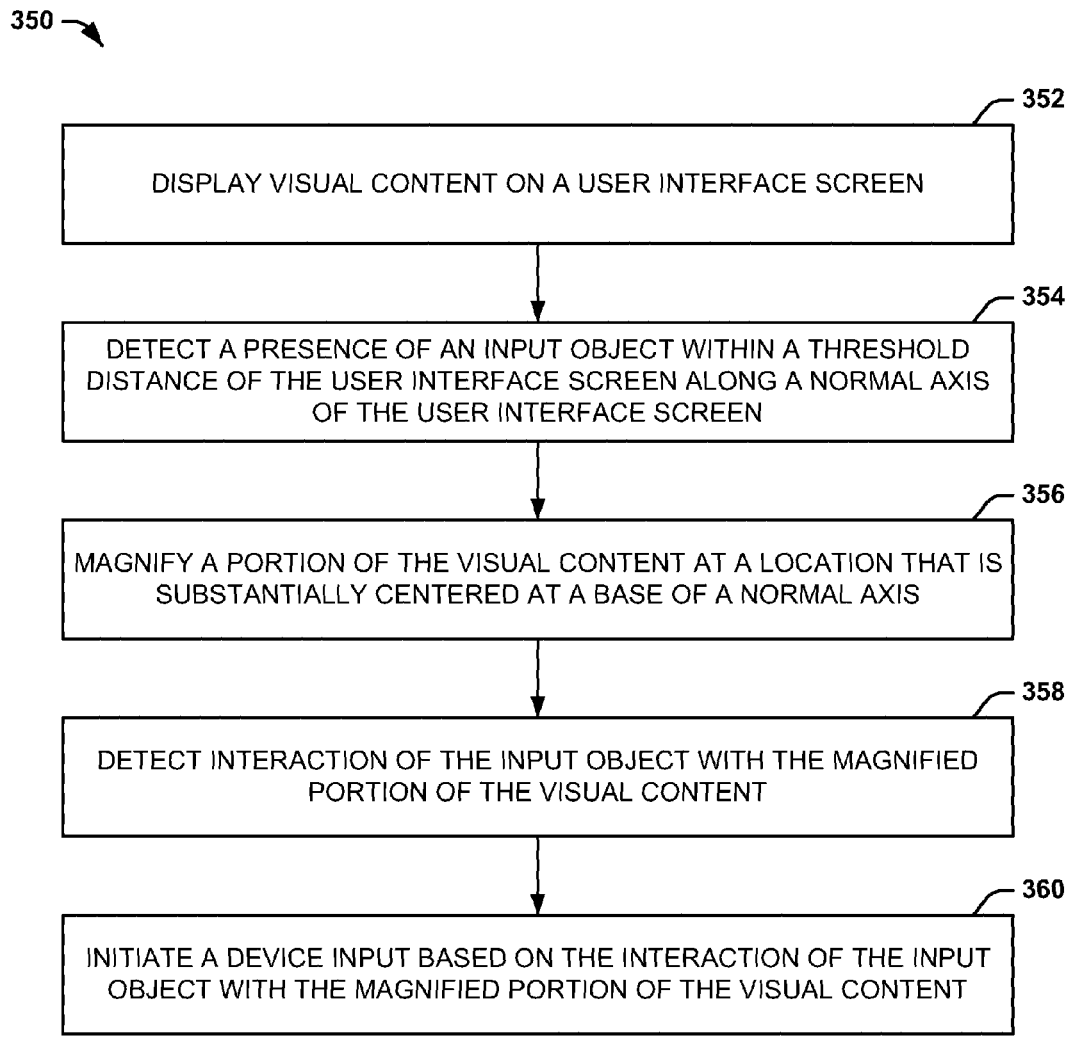
FIG. 15 illustrates an example of a method for providing inputs to a computer system in accordance with an aspect of the invention.

In view of the foregoing structural and functional features described above, a methodology in accordance with various aspects of the present invention will be better appreciated with reference to FIG. 15. While, for purposes of simplicity of explanation, the methodologies of FIG. 15 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 15 illustrates an example of a method 350 for providing inputs to a computer system in accordance with an aspect of the invention. At 352, visual content is displayed on a user interface screen. The user interface screen can be a touch-screen, a computer monitor, a projection screen, or a screen for a cellular phone or a PDA. The visual content can be computer monitor data. At 354, presence of an input object is detected within a threshold distance of the user interface screen along a normal axis of the user interface screen. The input object can be a user's finger, a stylus, or a wand. The input object can include a transmitter that transmits a signal, such that signal characteristics can be detected for a determination of the location and distance of the input object relative to the user interface screen. The signal can be a capacitive, acoustic, RF, optical, or electro-magnetic signal. As another example, the user interface screen could include a laser break-beam system, or could incorporate a stereo-camera assembly.

At 356, a portion of the visual content is magnified at a location that is substantially centered at a base of the normal axis. The magnification can be a result of the superimposition of scaled visual content data over the visual content. The superimposition can be such that surrounding visual content around the superimposed scaled visual data can be occluded or distorted. At 358, interaction of the input object with the magnified portion of the visual content is detected. The interaction can be contact of the input object with the user interface screen, or could be an associated gesture with the input object. At 360, a device input is initiated based on the interaction of the input object with the magnified portion of the visual content. The device input can be a computer input, such as a mouse-click.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer interface system comprising:
    a user interface screen configured to display visual content;
    an input system configured to detect a presence of an input object within a non-zero threshold distance along a normal axis of the user interface screen;
    a visual content display engine configured to magnify the portion of the visual content by superimposing a portion of a scaled copy of the visual content onto the visual content, the scaled copy of the visual content being magnified by a scale factor greater than one relative to the visual content; and
    a graphical controller configured to:
        magnify a portion of the visual content in accordance with the scale factor that is centered at an approximate location of a base of the normal axis on the user interface screen;
        set a fixed position on the visual content at an intersection of the normal axis and the visual content, and a corresponding fixed position on of the scaled copy of the visual content at an intersection of the normal axis and a respective superimposed portion of the scaled copy of the visual content in response to the input object being moved to within the threshold distance, such that the superimposed portion of the scaled copy of the visual content is moved a first distance from the corresponding fixed position along the scaled copy of the visual content in response to movement of the input object a second distance from the fixed position along the user interface screen within the threshold distance, the first distance and the second distance being approximately equal; and
        continuously superimpose a single contiguous portion of the scaled copy of the visual content onto the visual content, the single contiguous portion beginning at the fixed position on the user interface screen and continuing along a path on the user interface screen such that the single contiguous portion increases in size as it extends from the fixed position to a current position in response to contiguous movement of the input object along the path on the user interface screen from the fixed position to the current position within the threshold distance.

2. The system of claim 1, wherein the input system comprises an input detector configured to receive a device input based on an interaction of the input object with the magnified portion of the visual content.

3. The system of claim 2, wherein the input detector is configured as one of a touchscreen associated with the user interface screen and a stereo camera assembly configured to detect a location of the input object based on a parallax separation of the input object as perceived by each camera of the stereo camera assembly.

4. The system of claim 1, wherein the input system is configured to detect the presence of the input object based on one of a stereo camera assembly, a laser break-beam system, a capacitive sensing system, an acoustic sensing system, an electro-magnetic sensing system, and a radio-frequency identification system.

5. The system of claim 1, wherein the input object comprises a transmitter and wherein the input system is coupled to the user interface screen and comprises a receiver, the receiver being configured to receive signals transmitted from the transmitter to detect the presence of the input object within the threshold distance of the user interface screen.

6. The system of claim 1, further comprising:
    a memory configured to maintain data comprising the visual content and the scaled copy of the visual content, the scaled copy of the visual content having a scale factor relative to the visual content that is greater than one; and a visual content display engine configured to magnify the portion of the visual content by superimposing a portion of the scaled copy of the visual content onto the visual content.

7. The system of claim 6, wherein the graphical controller is configured to one of occlude portions of the visual content that surround the superimposed portion of the scaled copy of the visual content and distort the portions of the visual content that surround the superimposed portion of the scaled copy of the visual content.

8. The system of claim 6, wherein the graphical controller is configured to move the superimposed portion of the scaled copy of the visual content a first distance along the scaled copy of the visual content in response to movement of the input object a second distance along the user interface screen within the threshold distance, the first distance being scaled relative to the second distance by the scale factor.

9. The system of claim 1, wherein the graphical controller is configured to align an edge of the scaled copy of the visual content with a respective edge of the visual content as the fixed position in response to the base of the normal axis being within a threshold of a corresponding edge of the user interface screen, such that the graphical controller is further configured to superimpose the portion of the scaled copy of the visual content at a point on the portion of the scaled copy of the visual content that is a third distance relative to the edge of the scaled copy of the visual content over a corresponding point of the visual content that is the third distance relative to the edge of the visual content.

10. The system of claim 1, wherein, subsequent to the graphical controller superimposing the portion of the scaled copy of the visual content over the visual content, the graphical controller is further configured to move the scaled copy of the visual content relative to the visual content in a direction that is opposite an edge of the user interface screen in response to movement of the input object to within a threshold of the edge of the user interface screen.

11. The system of claim 1, wherein the threshold distance is a first threshold distance, and wherein the graphical controller is configured to magnify the portion of the visual content by a first amount at the first threshold distance and by a second amount at a second threshold distance relative to a surface of the user interface screen.

12. A method for providing inputs to a computer system, the method comprising:
displaying visual content on a user interface screen;
detecting a presence of an input object within a non-zero threshold distance of the user interface screen along a normal axis of the user interface screen;
magnifying a portion of the visual content by superimposing a portion of a scaled copy of the visual content onto the visual content at a location that is substantially centered at a base of the normal axis, the scaled copy of the visual content being magnified by a scale factor greater than one relative to the visual content;
detecting interaction of the input object with the magnified portion of the visual content; and
initiating a device input based on the interaction of the input object with the magnified portion of the visual content;
setting a fixed position of the scaled copy of the visual content relative to the visual content in response to the input object being moved to within the threshold distance at the normal axis;
contiguously moving the input object a distance from the fixed position along a path on the user interface screen within the threshold distance; and
continuously superimposing a single contiguous portion of the scaled copy of the visual content onto the visual content beginning at the fixed position on the user interface screen and continuing along the path on the user interface screen corresponding to the contiguous movement of the input object such that the single contiguous portion increases in size as it extends from the fixed position to a current position in response to the contiguous movement of the input object along the path on the user interface screen from the fixed position to the current position within the threshold distance.

13. The method of claim 12, wherein detecting the presence of the input object comprises detecting the presence of the input object based on one of a stereo camera assembly, a laser break-beam system, a capacitive sensing system, an acoustic sensing system, an electro-magnetic sensing system, and a radio-frequency identification system.

14. The method of claim 12, further comprising maintaining data comprising the visual content and a the scaled copy of the visual content, the scaled copy of the visual content having a scale factor relative to the visual content that is greater than one, wherein magnifying the portion of the visual content comprises superimposing a portion of the scaled copy of the visual content onto the visual content.

15. A computer interface system comprising:
means for displaying visual content;
means for detecting a presence of an input object within a non-zero threshold distance along a normal axis of the means for displaying the visual content;
means for concurrently maintaining data corresponding to the visual content and a scaled copy of the visual content, the scaled copy of the visual content having a scale factor relative to the visual content that is greater than one; and
means for superimposing a portion of the scaled copy of the visual content onto the visual content to magnify a respective portion of the visual content centered at a base of the normal axis in response to the detected presence of the input object, wherein the means for superimposing is further configured to set a fixed position of the scaled copy of the visual content relative to the visual content in response to the input object being moved to within the threshold distance, and to move the superimposed portion of the scaled copy of the visual content a distance along the scaled copy of the visual content in response to movement of the input object the distance along the user interface screen within the threshold distance relative to the fixed position, and to continuously superimpose a single contiguous portion of the scaled copy of the visual content onto the visual content, the single contiguous portion beginning at the fixed position on the user interface screen and continuing along a path on the user interface screen such that the single contiguous portion increases in size as it extends from the fixed position to a current position in response to contiguous movement of the input object along the path on the user interface screen from the fixed position to the current position within the threshold distance.

16. The system of claim 15, further comprising means for initiating a device input based on an interaction of the input object with the magnified respective portion of the visual content.

17. The system of claim 15, wherein the means for superimposing is further configured to superimpose the portion of the scaled copy of the visual content onto the visual content by rendering the superimposed portion of the scaled copy of the visual content as a virtual three-dimensional raised surface on the virtual content, such that transitional portions of the visual content that surround the superimposed portion of the scaled copy of the visual content are distorted.

* * * * *

UNITED STATES PATENT AND TRADEMARK OFFICE
CERTIFICATE OF CORRECTION

PATENT NO. : 9,658,765 B2  
APPLICATION NO. : 12/183786  
DATED : May 23, 2017  
INVENTOR(S) : H. Keith Nishihara et al.

Page 1 of 1

It is certified that error appears in the above-identified patent and that said Letters Patent is hereby corrected as shown below:

In the Specification

Column 18, Line 14 reads "on of the" should read --on the--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*